(12) United States Patent
Willson

(10) Patent No.: US 9,056,773 B2
(45) Date of Patent: Jun. 16, 2015

(54) PROCESS FOR THE MANUFACTURE OF HYDROGEN PEROXIDE

(71) Applicant: SOLVAY SA, Brussels (BE)

(72) Inventor: Andrew Willson, Tervuren (BE)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 14/355,589

(22) PCT Filed: Nov. 7, 2012

(86) PCT No.: PCT/EP2012/072052
§ 371 (c)(1),
(2) Date: May 1, 2014

(87) PCT Pub. No.: WO2013/068417
PCT Pub. Date: May 16, 2013

(65) Prior Publication Data
US 2014/0255295 A1 Sep. 11, 2014

(30) Foreign Application Priority Data
Nov. 7, 2011 (EP) .................................... 11188044

(51) Int. Cl.
*C01B 15/023* (2006.01)
(52) U.S. Cl.
CPC .................................... *C01B 15/023* (2013.01)
(58) Field of Classification Search
None
See application file for complete search history.

(56) References Cited

U.S. PATENT DOCUMENTS

| 4,485,084 A | 11/1984 | McIntyre |
| 5,196,179 A | 3/1993 | Turunen et al. |
| 6,153,169 A | 11/2000 | Glenneberg et al. |
| 7,056,485 B2 | 6/2006 | Creutz et al. |
| 2003/0165422 A1 | 9/2003 | Maurer |
| 2011/0225971 A1 | 9/2011 | Weres |

FOREIGN PATENT DOCUMENTS

| DE | 4029784 A1 | 4/1991 |
| JP | S 60-81499 A1 | 5/1985 |

OTHER PUBLICATIONS

Kirk-Othmer Encyclopedia of Chemical Technology, Aug. 2011, Chapter "Hydrogen Peroxide" (58 pages).
(Continued)

*Primary Examiner* — Melissa Swain
(74) *Attorney, Agent, or Firm* — Beatrice C. Ortego

(57) ABSTRACT

A continuous process for producing hydrogen peroxide by an anthraquinone process, comprising the steps of: (i) hydrogenating an organic working solution containing one or more anthraquinone derivatives in the presence of a heterogeneous catalyst to form a hydrogenated working solution; (ii) oxidizing the hydrogenated working solution by introducing an oxygen-containing oxidizing gas at an overpressure into an oxidation reactor, and contacting the oxidizing gas with the hydrogenated working solution to form an oxidized working solution, whereby hydrogen peroxide is formed; (iii) withdrawing an oxidation off gas from the oxidation reactor; (iv) recovering the formed hydrogen peroxide from the oxidized working solution; (v) subjecting the oxidation off gas withdrawn from said oxidation reactor, which has an excess pressure over atmospheric pressure, to a demisting treatment to obtain a demisted oxidation off gas; and (vi) feeding the demisted oxidation off gas as propellant gas into a gas ejector to produce a vacuum.

18 Claims, 1 Drawing Sheet

(56) References Cited

OTHER PUBLICATIONS

Ullmann's Encyclopedia of Industrial Chemistry, Fifth Edition, 1989, Volumn A13, 449-454 (6 pages).
Eames et al: "Results of an experimental study of an advanced jet-pump refrigerator operating with R245fa", Applied Thermal Engineering, Pergamon, Oxford, GB, vol. 27, No. 17-18, Aug. 26, 2007, pp. 2833-2840, XP022214866, ISSN: 1359-4311, DOI:10.1016/J.APPLTHERMALENG.2006.12.009 p. 2834, right-hand column, last paragraph-p. 2835, left-hand column, paragraph 1 (8 pages).
El-Mudir W et al: "Performance evaluation of a small size TVC desalination plant", Desalination, Elsevier, Amsterdam, NL, vol. 165, Aug. 15, 2004, pp. 269-279, XP004640365, ISSN: 00119164, DOI:10.1016/J.DESAL.2004.06.031, p. 269, paragraph 1.1.1 (12 pages).

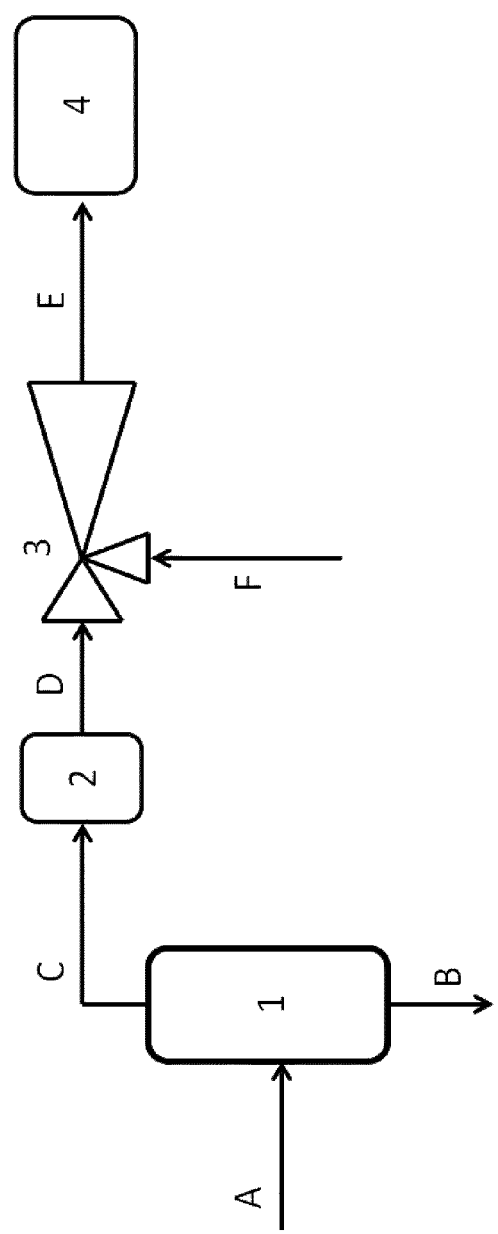

PROCESS FOR THE MANUFACTURE OF HYDROGEN PEROXIDE

CROSS-REFERENCE TO RELATED APPLICATIONS

This application is a U.S. national stage entry under 35 U.S.C. §371 of International Application No. PCT/EP2012/072052 filed Nov. 7, 2012, which claims priority to European application No. 11188044.9 filed on Nov. 7, 2011, the whole content of this application being incorporated herein by reference for all purposes.

Should the disclosure of any patents, patent applications, and publications which are incorporated herein by reference conflict with the description of the present application to the extent that it may render a term unclear, the present description shall take precedence.

TECHNICAL FIELD OF THE INVENTION

The present invention relates to a process for the manufacture of hydrogen peroxide by the anthraquinone process.

BACKGROUND

Processes for the manufacturing of hydrogen peroxide by the anthraquinone process are known in the art. The anthraquinone process typically comprises the cyclic reduction, oxidation and extraction of a solution containing an anthraquinone derivative. This solution containing the anthraquinone derivative is generally known in the art as "working solution" and it typically comprises a suitable inert solvent, typically an organic solvent, or mixtures thereof. The working solution further comprises at least one anthraquinone derivative, which is hydrogenated into its corresponding anthrahydroquinone derivative and reoxidized in the corresponding anthraquinone derivative during the cyclic anthraquinone process.

In the hydrogenation step, the anthraquinone derivative is reduced to the corresponding anthrahydroquinone derivative, usually by catalytic hydrogenation. In the subsequent oxidation step, the hydrogenated working solution, which is to be freed from the catalyst beforehand, is oxidized, typically by gassing with oxygen or an oxygen containing gas mixture. During oxidation, the anthrahydroquinone derivative is oxidized into the corresponding anthraquinone derivative, whereby hydrogen peroxide is obtained. The working solution containing the oxidized anthraquinone derivative and the hydrogen peroxide is extracted to remove the hydrogen peroxide and is recycled to be reused in the reduction step.

Further details of the anthraquinone process for the manufacture of hydrogen peroxide are disclosed in standard text books, e.g., Kirk-Othmer, Encyclopedia of Chemical Technology, August 2001, Chapter "Hydrogen Peroxide"; or Ullmann's Encyclopedia of Industrial Chemistry, fifth edition, 1989, Volume A 13, pages 449-454.

The oxidation step of the anthraquinone process is known in the art as both energy and solvent consuming. During the oxidation step, the oxidation gas has to be fed into the reactor with sufficient overpressure. The oxidation off gas obtained from the reactor, after sufficient contacting the working solution, is typically still under significant overpressure when leaving the oxidation reactor. Further, typically high amounts of solvents are still present in the oxidation off gas. Several solutions have been proposed in the art to overcome these disadvantages.

U.S. Pat. No. 4,485,084 suggests isentropic expansion of the oxidation off gas from the oxidizer in order to recover the solvent. By isentropic expansion in a turboexpander part of the energy of the overpressure can be recovered.

DE 4029784 suggests conducting the oxidation step with pure oxygen instead of air to avoid the production of oxidation off gas. As pure oxygen is expensive such process is economically very inefficient and therefore not suitable for continuous industrial process, where typically air is used as oxidation gas. The present invention is therefore directed to continuous processes for the manufacture of hydrogen peroxide, where no pure oxygen is applied as oxidizing gas and thus oxidation off gas is produced.

US 2003/0165422 A1 suggests feeding the oxidation off gas as a propellant gas in one or more gas jets (gas ejectors) in order to recover the energy present in the off gas, which is still under pressure.

It has been found that when the oxidation off gas obtained from the oxidation reactor, which is still under overpressure, is used as propellant gas for a gas ejector, the efficiency of the gas ejector is rather low and the ejectors have been found as mechanically unreliable and as causing frequent process off times.

SUMMARY OF THE INVENTION

It has now surprisingly been found that the efficiency and the mechanical reliability of the gas ejectors, which are fed with oxidation off gas obtained from oxidation reactors in processes for the manufacturing of hydrogen peroxide by the anthraquinone process, can be significantly improved, if the oxidation off gas is demisted before being fed into the gas ejectors. Not wishing to be bound by theory it is believed that small droplets present in the oxidation off gas, typically composed of working solution present in the oxidation reactor, reduce the efficiency and in particular the mechanical reliability of the gas ejectors, in particular in continuous processes of industrial scale. According to the present application the process for the production of hydrogen peroxide by the anthraquinone process as known in the art comprises the additional step of demisting oxidation off gas in order to obtain a demisted oxidation off gas, which is still under overpressure and can be advantageously used as propellant gas to be fed into a gas ejector. The vacuum produced by the gas ejector can be advantageously used, preferably in one or more process steps of the anthraquinone process.

The present invention therefore relates to a continuous process for the production of hydrogen peroxide by the anthraquinone process, comprising the steps of (i) hydrogenating an organic working solution containing one or more anthraquinone derivatives in the presence of a heterogeneous catalyst to form a hydrogenated working solution, (ii) oxidizing the hydrogenated working solution by introducing an oxygen-containing oxidizing gas at an overpressure into an oxidation reactor, and contacting the oxidizing gas with the hydrogenated working solution to form an oxidized working solution, whereby hydrogen peroxide is formed, (iii) withdrawing oxidation off gas from the oxidation reactor, and (iv) recovering the hydrogen peroxide from the oxidized working solution, which process comprises the steps of (v) subjecting the oxidation off gas leaving the oxidation reactor, which has an excess pressure over the atmospheric pressure, to a demisting treatment to obtain a demisted oxidation off gas, and (vi) feeding the demisted oxidation off gas as propellant gas into a gas ejector to produce a vacuum.

BRIEF DESCRIPTION OF THE DRAWING

FIG. 1 shows a schematic representation of a preferred process of the present invention.

DETAILED DESCRIPTION OF THE INVENTION

Working solutions which can be used in the process of the present invention are known in the art. Suitable working solutions typically comprise a solvent which dissolves the anthraquinone derivative and the anthrahydroquinone derivative used, or a mixture of solvent, e.g., wherein one solvent dissolves the anthraquinone derivative and one solvent dissolves the anthrahydroquinone derivative used. Suitable anthraquinone derivatives, which can be converted into the corresponding anthrahydroquinone derivative and reversibly oxidized in the corresponding anthraquinone derivative are known, in particular alkyl anthraquinones. Preferably used are 2-alkyl anthraquinones, the alkyl group being more preferably a linear or branched $C_2$-$C_6$ alkyl group. Suitable anthraquinone derivatives are disclosed in U.S. Pat. No. 6,153,169.

The hydrogenation step (i) is known in the art and is typically conducted in the presence of a heterogeneous catalyst. In the hydrogenation step, the anthraquinone derivative is hydrogenated, e.g., by hydrogen gas, into the corresponding anthrahydroquinone derivative. Suitable process parameters and catalysts are known in the art.

In the oxidizing step (ii) of the process of the present invention, the hydrogenated working solution obtained in step (i) is subjected to oxidation by introducing an oxygen-containing oxidizing gas, typically air or air enriched in oxygen. The oxidizing gas is fed into the oxidation reactor with an overpressure, relative to the pressure in the reactor. The overpressure is typically at least about 200 mbar, preferably at least about 400 mbar, in particular in the range of about 0.5 bar to about 5 bar, relative to the pressure in the reactor.

The oxidizing gas is fed into the oxidation reactor, which is suitably constructed in order to provide sufficient contacting of the oxidizing gas with the hydrogenated working solution, to form an oxidized working solution. The pressure in the oxidation reactor is typically at least about 500 mbar, preferably at least about 1 bar, in particular in the range of about 2 bar to about 15 bar, above atmospheric pressure.

After sufficiently contacting the working solution in the oxidation reactor, the oxidizing gas, which is reduced in its oxygen content, is withdrawn from the oxidation reactor in step (iii) of the process according to the present invention as oxidation off gas. Due to the pressure drops across the reactor, the overpressure of the oxidation off gas is less than the overpressure of the oxidizing gas fed into the reactor. When leaving the reactor, preferably the excess pressure of the oxidation off gas is still in the range of about 0.5 to about 15 bar, preferably about 1 bar to about 10 bar, in particular about 1.5 bar to about 8 bar over the atmospheric pressure.

The oxidized working solution is typically withdrawn from the oxidation reactor, and the hydrogen peroxide formed is recovered as known in the art in step (iv) of the process of the present invention.

According to the process of the present invention the oxidation off gas leaving the oxidation reactor is subjected in step (v) to a demisting treatment to obtain a demisted oxidation off gas. Demisting treatment according to the present invention means removal of liquid droplets entrained in the oxidation off gas. The oxidation off gas withdrawn from oxidation reactors has typically a liquid content in the form of droplets of about 300 to 2,000 mg/m$^3$. In the demisting treatment according to the present invention, typically at least 50%, more preferably at least 80%, in particular at least 95% of the liquid content in the form of droplets entrained in the oxidation off gas are removed. Preferably the liquid content of the demisted oxidation off gas is below 1,000 mg/m$^3$, more preferable below 400 mg/m$^3$, in particular below 100 mg/m$^3$, e.g., below 20 mg/m$^3$, and preferably in the range of 150 to 1,000 mg/m$^3$, more preferable in the range of 60 to 400 mg/m$^3$, in particular in the range of 15 to 100 mg/m$^3$. Suitable devices for removal of liquid droplets from gases are known in the art as demisters or droplet separators. Demisting devices according to the present invention are known cyclone like devices or devices known as demisters. Demisters are known in the art as devices typically fitted with mesh type coalescers, vane packs or similar structures intended to aggregate the mist into droplets that are heavy enough to separate from the gas stream. Suitable devices are commercially available e.g., mist eliminator type HE"PLUS"2450EFR, obtainable by MECS, Inc. Preferably a combination of a demister and a cyclone is used, more preferably the demister is installed in the oxidation reactor, and the cyclone is installed downstream the reactor. The demister can also be installed outside the reactor; a condenser can be installed upstream the cyclone to enhance the separation of organics.

After the oxidation off gas has been subjected to a demisting treatment, the demisted oxidation off gas is fed in step (vi) as propellant gas into a gas ejector. Gas ejectors, which are also termed in the art as jet pumps, gas injectors, steam ejectors or thermocompressors, are known pump-like devices. These devices use the Venturi effect of a converging-diverging nozzle to convert the pressure energy of a motive fluid to velocity energy which creates a low pressure zone that draws in and entrains a suction fluid. After passing through the throat of the ejector, the mixed fluid expands and the velocity is reduced which results in recompressing the mixed fluids by converting velocity energy back into pressure energy. The entrained suction fluid may be a gas, a liquid, a slurry or dust—laden gas stream.

The vacuum produced by the gas ejector fed with the demisted oxidation off gas can advantageously be used in the process for producing hydrogen peroxide, where a pressure below atmospheric pressure is needed. Preferably, a vacuum of about 50 mbar to about 900 mbar (absolute) is produced. Preferably, the vacuum is used to withdraw solvent vapors from a storage tank, e.g., tanks for solvent, for drying the working solution, for distillation processes, e.g., in distillation columns for purification of hydrogen peroxide, and/or for producing the vacuum for withdrawing ventilation gases from an atmospheric pressure oxidation reactor. The mixture of the oxidation off gas used as propellant gas and the suction gas withdrawn can be subsequently passed to the waste-gas purifier. Suitable waste-gas purifiers are known in the art.

For withdrawing solvent vapors, e.g., from solvent storage tanks or atmospheric pressure oxidation reactors a vacuum of from 200 mbar to 900 mbar (absolute) is sufficient.

For drying the working solution a vacuum within the range of 10-300 mbar (absolute), in particular 20-100 mbar (absolute) is sufficient, which can be prepared by the gas ejector fed with the demisted oxidation off gas.

When the vacuum is used for the distillation column, e.g., for concentrating the aqueous hydrogen peroxide solution produced in the process of the present invention, a vacuum generally in the range of 20-200 mbar, in particular 50-150 mbar is sufficient and may be provided by the gas ejector.

In the process of the present invention, the demisted oxidation off gas ejected from the gas ejector which is mixed with suction gas, is preferably fed into a waste-gas treatment section. The waste-gas treatment section preferably comprises an adsorption stage in order to remove organics from the gas mixture of the propellant gas and withdrawn gases. In a preferred embodiment, the adsorption comprises feeding the gas mixtures through a bed of adsorbent material, preferably activated carbon or zeolite, in order to free said mixture from organic constituents. The solvent freed gas may be discharged or recycled for further use in the process of the present invention.

The present invention further relates to a plant for the production of hydrogen peroxide by the anthraquinone process which is suitable for conducting the process according to the present invention. Preferably, the plant comprises an oxidizing reactor with a demister installed inside or outside the reactor, more preferably the plant additionally comprises a cyclone, and optionally a condenser, installed downstream the oxidation reactor.

FIG. 1 shows a schematic representation of a preferred process of the present invention.

In the scheme of FIG. 1, oxidizing gas A is fed into oxidation reactor 1. Oxidized working solution B is withdrawn from the oxidation reactor 1. Oxidation off gas C, which is still under excess pressure over atmospheric pressure, is withdrawn from the oxidation reactor 1 and fed into a demister 2. The demisted oxidation off gas D obtained from demister 2 is used as propellant gas for a gas ejector 3. The gas ejector produces a vacuum by withdrawing suction gas F. This vacuum can be used in the process for manufacturing hydrogen peroxide, in particular for withdrawing solvent vapors from storage tanks, drying the working solution, running a distillation column, or withdrawing ventilation gases from atmospheric pressure oxidation reactors.

The mixture of a demisted oxidation off gas and the withdrawing gases E are typically fed into waste-gas treatment section 4, which preferably comprises adsorption steps in order to free the gas from residual organic constituents.

The process according to the present invention enables the efficient use of the excess pressure of the oxidation off gas by elimination of the entrained droplets of the working solution, before feeding the gas into a gas ejector, prior to the final purification step. Thereby the gas ejector can be operated in a more efficient and reliable way. The vacuum obtained can be used at various points in the overall process in order to reduce the total energy consumption in a process for preparing hydrogen peroxide.

EXAMPLES

The invention will be further illustrated by means of the following examples.

Example 1

In a continuous test plant for manufacturing hydrogen peroxide, the oxidation off gas obtained from the oxidation reactor, having an absolute pressure of about 7 bar abs, is used as propellant gas for a commercially available gas ejector. The vacuum, obtained from the gas ejector, is used to keep the pressure in a reactor containing organic solvents below atmospheric pressure.

The oxidation off gas, before entering the ejector, is passed through a demister installed inside the oxidizer. Without prior demisting treatment, the test system had to be repeatedly switched off due to malfunction of the gas ejector.

Thanks to the elimination of liquid droplets from the gaseous stream, the test plant can be continuously operated without malfunctions of the gas ejector.

Example 2

In a continuous test plant for manufacturing hydrogen peroxide part of the oxidation off gas obtained from the oxidation reactor, having an absolute pressure of about 7.7 bar abs, is used as propellant gas for a commercially available gas ejector. The vacuum obtained from the gas ejector, is used to keep a reactor containing organic solvents below atmospheric pressure.

The off gas, before entering the ejector, is first passed through a demister installed inside the oxidizer. The so obtained off gas subsequently is cooled down in a heat exchanger, and the condensed droplets are separated in a cyclone.

Part of the off gas is fed to two commercial ejectors to keep an extraction tower and two vessels under vacuum, so that no organic emission is possible.

The combined demister and cyclone treatment allows the test system to run steadily at rather stable and constant vacuum without any maintenance intervention.

The invention claimed is:

1. A continuous process for producing hydrogen peroxide by an anthraquinone process, comprising:
   (i) hydrogenating an organic working solution containing one or more anthraquinone derivatives in presence of a heterogeneous catalyst to form a hydrogenated working solution;
   (ii) oxidizing said hydrogenated working solution by introducing an oxygen-containing oxidizing gas at an overpressure into an oxidation reactor characterized by a pressure, and contacting said oxidizing gas with said hydrogenated working solution to form an oxidized working solution, whereby hydrogen peroxide is formed, said overpressure being relative to the pressure of said oxidation reactor;
   (iii) withdrawing an oxidation off gas from said oxidation reactor;
   (iv) recovering said formed hydrogen peroxide from said oxidized working solution;
   (v) subjecting said oxidation off gas leaving said oxidation reactor, said oxidation off gas having an excess pressure over atmospheric pressure, to a demisting treatment to obtain a demisted oxidation off gas; and
   (vi) feeding said demisted oxidation off gas as propellant gas into a gas ejector to produce a vacuum.

2. The process according to claim 1, wherein said overpressure of said oxidizing gas fed into said oxidation reactor relative to the pressure in said oxidation reactor is at least about 200 mbar.

3. The process according to claim 2, wherein said overpressure of said oxidizing gas fed into said oxidation reactor is ranging from about 0.5 bar to about 5 bars.

4. The process according to claim 1, wherein said oxidation off gas withdrawn from said oxidation reactor has an excess pressure ranging from about 1 bar to about 10 bars over atmospheric pressure.

5. The process according to claim 1, wherein said gas ejector produces a vacuum by drawing in a suction fluid; wherein said demisted oxidation gas fed as propellant gas into said gas ejector is mixed with said suction fluid to form a mixture ejected from an outlet of said gas ejector; and wherein the process further comprises a step of removing organics from said mixture obtained from said outlet of said gas ejector.

6. The process according to claim 5, wherein said removal of organics is conducted by passing said mixture obtained from said outlet of said gas ejector through a bed of an adsorbent material, and freeing said mixture from organic constituents.

7. The process according to claim 6, wherein said bed of absorbent material is activated carbon or a zeolite.

8. The process according to claim 1, wherein the step (vi) of feeding said demisted oxidation off gas to said gas ejector produces a vacuum for withdrawing solvent vapors from a storage tank.

9. The process according to claim 1, wherein the step (vi) of feeding said demisted oxidation off gas to said gas ejector produces a vacuum for running a distillation column.

10. The process according to claim 1, wherein the step (vi) of feeding said demisted oxidation off gas to said gas ejector produces a vacuum for withdrawing ventilator gases from one or more atmospheric pressure oxidation reactors.

11. The process according to claim 1, wherein the step (vi) of feeding said demisted oxidation off gas to said gas ejector comprises feeding a first part of said oxidation off gas to a first gas ejector to produce a vacuum for withdrawing solvent vapors from a storage tank, and feeding at least one other part of said demisted oxidation off gas to at least one other gas ejector to produce a vacuum for at least one of the following steps selected from the group consisting of: drying said working solution; running a distillation column; and withdrawing ventilator gases from one or more atmospheric pressure oxidation reactors.

12. A plant for producing hydrogen peroxide by an anthraquinone process which is operated for conducting the process according to claim 1.

13. The plant according to claim 12, comprising an oxidation reactor and a demister, wherein said demister is installed inside said oxidation reactor.

14. The process according to claim 1, wherein the step (vi) of feeding said demisted oxidation off gas to said gas ejector produces a vacuum of from about 50 mbar absolute to about 900 mbar absolute.

15. The process according to claim 1, wherein said demisted oxidation off gas has a liquid content below 1,000 mg/m$^3$.

16. The process according to claim 8, wherein said vacuum for withdrawing solvent vapors from storage tanks is from 200 mbar absolute to 900 mbar absolute.

17. The process according to claim 9, wherein said vacuum for running the distillation column is from 20 mbar absolute to 200 mbar absolute.

18. The process according to claim 1, wherein said demisting treatment in step (vi) is done with a demister installed inside said oxidation reactor.

\* \* \* \* \*